United States Patent [19]

Trihey

[11] 4,390,241
[45] Jun. 28, 1983

[54] REFLECTIVE TROUGH STRUCTURE

[75] Inventor: John M. Trihey, Ringwood, Australia

[73] Assignee: Vulcan Australia Limited, Victoria, Australia

[21] Appl. No.: 327,909

[22] Filed: Dec. 7, 1981

Related U.S. Application Data

[60] Division of Ser. No. 953,771, Oct. 19, 1978, Pat. No. 4,304,221, and Ser. No. 122,054, Feb. 15, 1980, Pat. No. 4,321,909, each is a continuation-in-part of Ser. No. 883,313, Mar. 3, 1978, Pat. No. 4,324,225, which is a continuation-in-part of Ser. No. 704,674, Jul. 12, 1976, Pat. No. 4,089,323.

[30] Foreign Application Priority Data

| Jul. 11, 1975 | [AU] | Australia | PC2334/75 |
| Apr. 21, 1977 | [AU] | Australia | PC9839/77 |
| Feb. 23, 1979 | [AU] | Australia | PD7808/79 |
| Aug. 23, 1979 | [AU] | Australia | PE0157/79 |
| Aug. 23, 1979 | [AU] | Australia | PE0158/79 |
| Aug. 23, 1979 | [AU] | Australia | 0159/79 |

[51] Int. Cl.³ ............................ G20B 5/10; F23J 3/02
[52] U.S. Cl. .................................. 350/296; 126/438; 126/439
[58] Field of Search ............... 126/438, 439, 451, 417; 350/288, 292, 293, 310, 296

[56] References Cited

U.S. PATENT DOCUMENTS

| 73,355 | 1/1868 | Marshall | 126/438 X |
| 1,814,897 | 7/1931 | Coxe | 126/438 |
| 4,077,392 | 3/1978 | Garner | 126/438 X |
| 4,135,493 | 1/1979 | Kennedy | 126/438 |
| 4,268,332 | 5/1981 | Winders | 126/438 X |
| 4,276,873 | 7/1981 | Uroshevich | 126/438 |

Primary Examiner—Larry Jones
Attorney, Agent, or Firm—Cushman, Darby & Cushman

[57] ABSTRACT

This specification discloses a reflective trough structure suitable for use in solar energy collecting apparatus. The trough structure comprises an initially flat sheet of aluminium which is resiliently deformed into engagement with concave ribs so that the sheet assumes a parabolic configuration without any need to work the surface of the aluminium sheet which would tend to degrade the reflective properties of the sheet.

11 Claims, 9 Drawing Figures

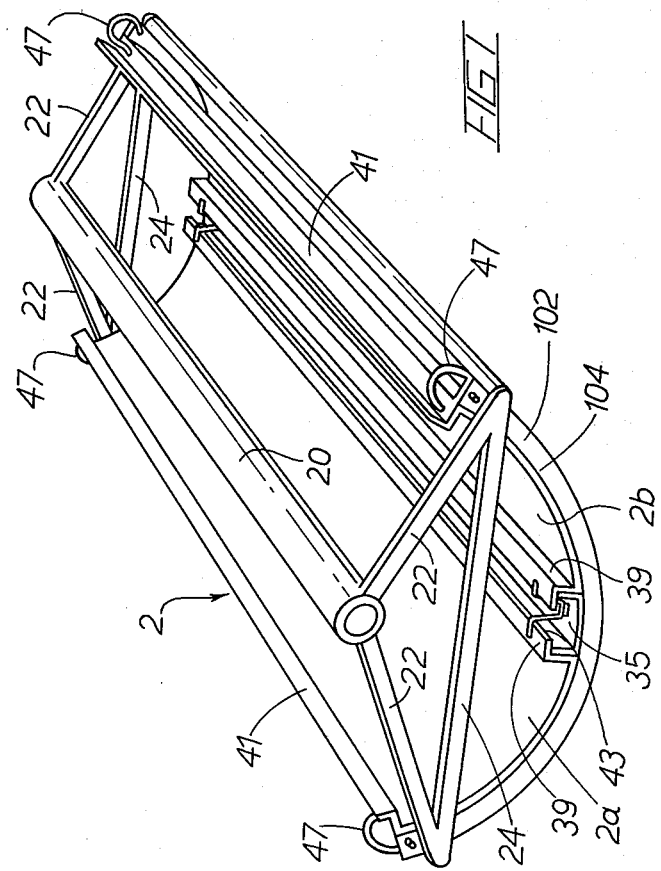

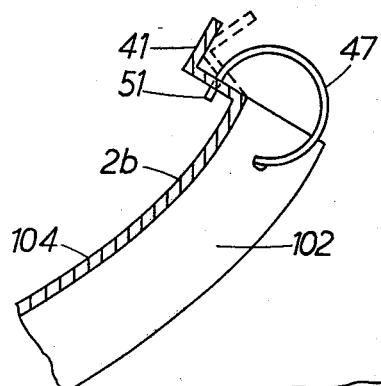
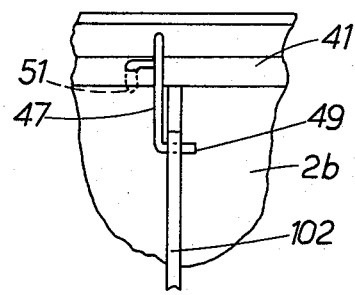
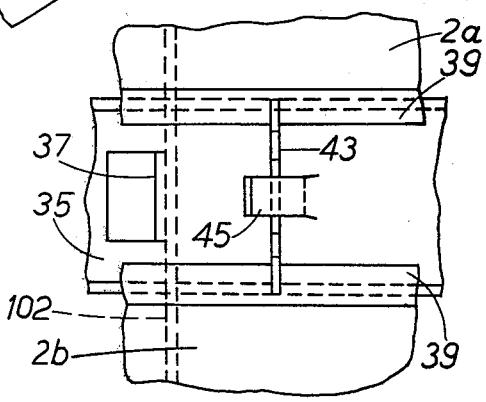
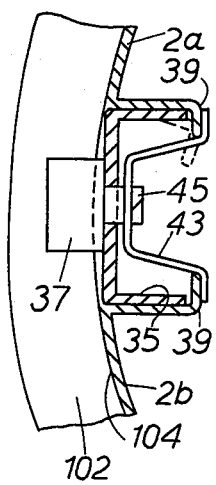

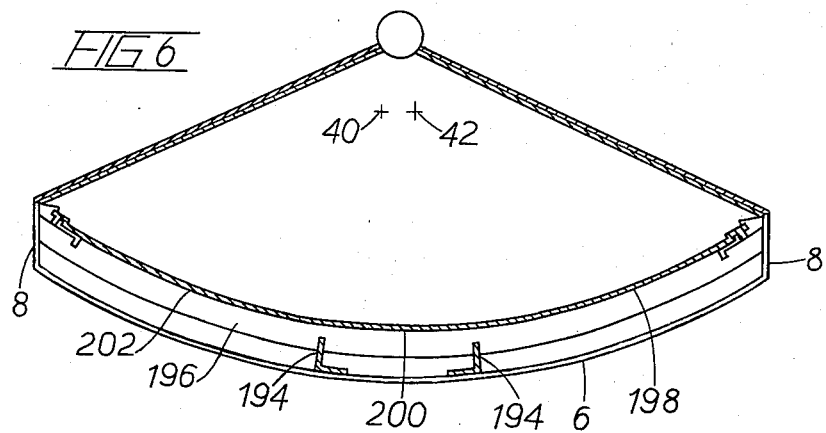
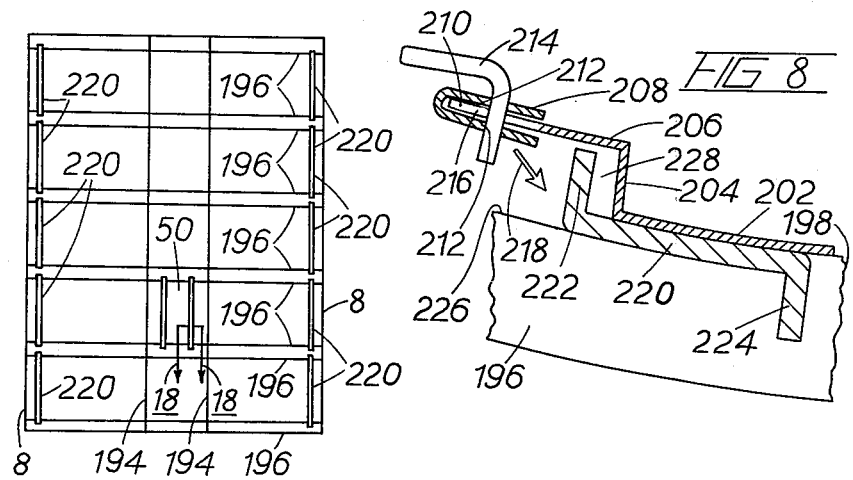
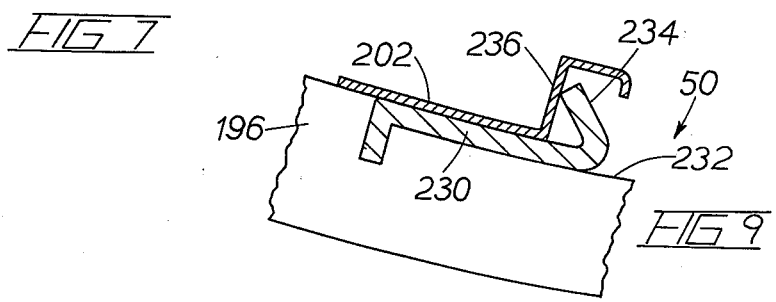

REFLECTIVE TROUGH STRUCTURE

The application is a joint divisional application from application Ser. Nos. 953,771 and 122,054 filed on Oct. 19, 1978 and Feb. 15 1980 respectively, now U.S. Pat. Nos. 4,304,221 and 4,321,909, respectively. The aforementioned applications are both continuation-in-parts of application Ser. No. 883,313 filed Mar. 3, 1978, now U.S. Pat. No. 4,324,225, that application being filed as a continuation-in-part of application Ser. No. 704,674 filed July 12, 1976 and now issued as U.S. Pat. No. 4,089,323.

This invention relates to a reflective trough structure.

The principal object of the present invention is to provide a simple yet effective technique for the fabrication of parabolic reflecting troughs which are suitable for concentrating solar energy on an energy utilization surface such as the outer surface of a heat transfer conduit.

It is a further object of the present invention to enable parabolic troughs to be fabricated the troughs having very sharp focal lines. By having very sharp focal lines, the heat losses from the energy utilization surfaces are reduced because the surface areas can be made smaller thereby reducing the amount of heat loss by re-radiation or convectional losses.

According to a first aspect of the invention there is provided a parabolic trough comprising a plurality of formers each having a concave parabolic edge, connecting means interconnecting the formers together such that their parabolic edges lie upon a parabolic surface, a sheet of resilient material, and mounting means for mounting the sheet such that one face thereof is biased into engagement with the parabolic edges of the formers whereby the other side of the sheet assumes the configuration of a concave parabolic trough.

According to a second aspect of the invention there is provided apparatus wherein said motor is a reversible motor said first and second switches being operable to make a driving current circuit in a predetermined polarity to said motor and wherein said cell or cells operate to break said circuit.

In both of the arrangements defined above, the sheet material preferably comprises an initially flat sheet of aluminium which is available in a highly polished form directly from the manufacturers. The initially flat sheet is then resiliently deformed into contact with the formers or ribs so as to assume the concave parabolic configuration. The process does not involve any surface working of the aluminium and therefore the highly polished surfaces of the aluminium are not degraded.

The techniques of the invention are applicable for forming reflective parabolic troughs which have a single focal line or a pair of spaced parallel focal lines.

The invention will now be more fully described with reference to the accompanying drawings, in which:

FIG. 1 is a perspective view of part of the parabolic reflector and its support structure;

FIG. 2 is a cross sectional detail showing the manner of construction of the parabolic reflector;

FIG. 3 is a side view of the detail illustrated in FIG. 2;

FIG. 4 is a cross sectional view through the central portion of the reflector;

FIG. 5 is a detailed plan view at the central portion of the reflector;

FIG. 6 is a transverse section showing a modified form of construction of the trough in accordance with the invention, FIG. 7 is a schematic plan view of the trough;

FIG. 8 is a more detailed cross-sectional view illustrating the construction of the trough; and FIG. 9 is a partial cross-section taken along the line 18—18.

The reflective trough 2 illustrated in FIGS. 1 to 5 has a plurality of ribs 102 each of which is formed with a concave edge 104 which is parabolic in shape. The reflective trough 2 is formed by resiliently depressing a flat sheet of reflective material such as aluminium into contact with the parabolic edges 104 of the ribs 102. In this manner an accurately formed parabolic trough can be manufactured at very low cost. In the illustrated arrangement, the trough is formed in two portions 2a and 2b which produce respective spaced focii but the principles are equally applicable to a single parabolic trough. The upper ends of the ribs 102 are connected to the free ends of arms 22 and the free ends of the arms 22 are additionally braced by bracing members 24. The centres of the ribs 102 are connected together by means of a longitudinally extending channel 35. The interconnection of the channel 35 and the ribs 102 is preferably by means of downwardly projecting tabs 37 punched from the web of the channel and affixed to the ribs 102. In the illustrated arrangement, the portions 2a and 2b are formed by initially flat sheets of aluminium which are formed with L-shaped flanges 39 and 41 along their inner and outer longitudinal edges respectively. The flanges 39 and 41 strengthen the side edges of the sheets and prevent unwanted distortions of the sheets in the unsupported regions between the ribs 102. Additionally, the flanges 39 and 41 are used in the connection of the sheets to the ribs.

The inner flanges 39 engage the upstanding legs of the central channel 35 and so locate the inner edges of the aluminium sheets. The flanges 39 are retained in position by means of clips 43 which extend from the web of the channel 35 and engage the top faces of the L-shaped flanges 39. The interconnection of the clips 43 with the web of the channel 35 is preferably by means of tabs 45 which are pressed from the web of the channel 35. As shown in FIG. 4, the L-shaped flange 39 is initially at right angles to the flat sheet of aluminium as indicated in broken lines in FIG. 4 but in its operative position it is deflected inwardly somewhat by the channel 35 and this assists in maintaining snug engagement of the sheet with the parabolic edge 104 of the rib to improve the fidelity of the resultant parabolic surface.

The outer L-shaped flanges 41 are used to interconnect the sheets to the upper ends of the ribs 102, as best seen in FIGS. 2 and 3. The clips 47 are provided with oppositely directed end portions 49 and 51 which pass through appropriately located recesses so as to hold the sheet in position firmly against the parabolic edge 104 of the ribs.

In addition to the clips 43 and 47, it is preferred that the inner flanges 39 are fixed at the centre of each sheet to the channel 35 so as to permit thermal expansion of the sheets in the longitudinal direction. Any thermal expansion of the sheets in the lateral direction is accommodated by means of flexure of the springs 47. The upper flange 41 is inclined somewhat outwardly of its final position as indicated in broken lines in FIG. 2 and this assists in attaining the correct parabolic configuration of the surface. A somewhat modified form of trough construction is illustrated in FIGS. 6 to 9. In this arrangement the trough 2 is located within a housing 6 as having a generally parabolic configuration with upturned side walls 8. Extending longitudinally of the housing are two support beams 194 of L-section. The beams 194 provide central support for a plurality of ribs 196 which are connected at their outer ends to the side wall 8. The ribs 196 each have an accurately cut concave edge 198 which has a central flat 200 located directly beneath the support bar 12 and approximately the same width as the tube 4.

On either side of the flat 200 are two parabolic edge portions which have their respective focii on lines 40 and 42. There are a number of ribs 196 and each of them are supported so that their edges 198 are aligned so that the parabolic portions lie on respective parabolic surfaces and sheets 202 of highly reflective material such as aluminium are held in engagement with the edges 198 so that the sheets 202 assume the appropriate parabolic configurations.

FIG. 7 illustrates a view of a typical trough with the sheets 202 removed. In this arrangement it will be noted that the ribs 196 are arranged in pairs along the length of the trough except at the ends, so that wide strips of sheet material 202 can be laid transversely across the trough, the edges of the strips being adjacent to respective ribs. The opening 50 through which control equipment may pass is formed by a pair of shorter strips one on either side of the gap 50, as seen in FIG. 7.

FIG. 8 illustrates the preferred technique for accurately holding the sheets 202 against the parabolic edges 198 of the ribs. The sheet 202 is formed to have a step portion comprising an upward leg 204 and a lateral flange portion 206. The outer edge of the flange portion is located within a stiffening member 208 which is of generally U-shape and in engagement with the outer edge 210 of the flange portion 206. The stiffening member 208 extends for the full width of the sheet 202. The member 208 is provided with pairs of aligned holes 212 through which one end of biasing springs 214 pass. The flange portion 206 is provided with a clearance hold 216 so that the springs 214 do not engage the flange portion 206. The other end of the springs 214 bear against the side walls 8 of the housing and the arrangement is such that the springs 214 bias the sheets 202 in the direction of arrow 218 i.e. towards the centre of the trough and downwardly towards the ribs 196. The stiffening members 208 ensure that the biasing effect of the springs 214 is distributed uniformaly along the length of the sheets. The sheets 202 are supported at their outer edges in regions inwardly of the legs 204 by means of beams 220 which are formed with stiffening flanges 222 and 224. The beams 220 are located in rebates 226 formed in the ribs 196 so that the upper surface of the beam is more or less continuous with the parabolic edge 198 as shown, the downturned flange being slotted so as to receive the ribs at the junction points. The beams 220 provided support for the edges of the sheets and ensure that there is no unwanted warping of the sheet material at the edges of the trough. It will be noted that a gap 228 is left between the upturned leg 204 of the sheet and the upturned flange 222 of the beam 220 so as to accommodate differences in thermal expansions between the ribs 196 on the one hand and of the reflective sheet 202 on the other.

FIG. 9 illustrates a suitable mounting for the reflective sheets at the opening 50. In this case the ribs 196 are spanned by a pair of inner support beams 230 located on either side of the gap 50. The beams 230 have downturned flanges which are slotted to receive the ribs 196 and the ribs themselves are formed with rebates 232 to receive the beams 230. The beams 230 are provided with upturned legs 234 against which an upturned leg portion 236 of the sheet 202 abuts as shown. The trough of the foregoing construction has been found to be capable of relatively easy construction and yet provides very accurate focusing which is necessary for efficient operation of the apparatus.

I claim:

1. A trough comprising a plurality of ribs each having a concave edge and means to hold the ribs in fixed position relative to one another so that said edges lie on a common surface, and resilient sheet material one side of which is resiliently constrained into engagement with said edges and the other side of the sheet material being reflective to thereby form a reflective trough characterized said sheet material is formed with integral flanges on its lateral edges, each flange each having a first leg which is generally normal to the sheet material and a second leg which projects outwardly from the top of the first leg, and force distributing members comprising channel members and wherein the outer edges of said second legs are received within said channel members, resilient forces being applied to the channel members to resiliently bias the sheet material into intimate contact with said ribs.

2. A trough as claimed in claim 1 including resilient mounting clips and wherein said second legs are formed with openings and wherein said channel members have openings therethrough which are aligned with the openings in the second legs whereby the ends of the mounting clips can pass through said aligned openings and engage and apply to said channel members resilient forces which are downwardly and inwardly directed relative to the trough, the openings in said second legs being of such size and position that the clips do not engage the second legs.

3. A reflective trough as claimed in claim 1 wherein the parabolic edges of the formers include a central, non-parabolic portion whereby the sheet material assumes a trough configuration with two parabolic portions with respective focal lines which are spaced apart by a distance which corresponds to said non-parabolic portion of the edges.

4. A trough as claimed in claim 1 wherein the edge regions of the sheet material are supported between adjacent ribs.

5. A trough as claimed in claim 4 wherein the edge regions of the sheet material are supported by beams which run longitudinally of the trough and span adjacent ribs, the ribs being rebated to receive such beams, the arrangement being such that the upper surfaces of the beams are contiguous with said common surface.

6. A trough as claimed in claim 4 wherein said concave edges are parabolic or generally parabolic so that said reflective surface is constrained to assume a parabolic surface configuration.

7. A trough as claimed in claim 6 wherein said concave edges have a central flat and a parabolic portion on either side thereof said parabolic portions having spaced focii so that said reflective surface is constrained to assume a pair of parabolic surface configurations with spaced focal lines.

8. A trough as claimed in claim 6 wherein said sheet material is slidable relative to said concave edges whereby the sheet material remains in contact therewith despite differences in thermal expansions.

9. A reflective parabolic trough comprising a plurality of formers each having a concave parabolic edge, connecting means interconnecting the formers together such that their parabolic edges lie upon a parabolic surface, reflective resilient sheet material, said sheet material comprising sheets of aluminium which are initially flat except for integral flanges formed on side edges which are located at the sides of the trough, each flange has a first leg which is generally normal to the sheet and a second leg which projects laterally outwardly from the top of the first leg and mounting means for mounting the sheets such that undersides thereof are biased into engagement with the parabolic edges of the formers whereby the outer sides thereof assume the configuration of a concave parabolic trough, said mounting means including clips mounted between said formers and the first legs of the flanges and being operable to apply resilient forces to the first legs, said forces having components which and normal so the sheet and inwardly directed relative to the trough to thereby maintain initimate contact between the formers and the sheets.

10. A reflective trough as claimed in claim 9 wherein said first legs are initially formed so as to project slightly outwardly relative to normals to the sheets and are resiliently deflected to almost true normal positions by said clips when said sheets are mounted in the formers.

11. A reflective trough as claimed in claim 10 wherein said clips are made from spring steel and include loop portions which extend from the ends of the formers to the adjacent first legs of the flanges.

* * * * *